United States Patent [19]
Krings et al.

[11] 3,764,178
[45] Oct. 9, 1973

[54] SAFETY WINDSHIELD

[75] Inventors: Hans Krings; Franz Kramling, both of Aachen, Germany

[73] Assignee: Saint-Gobain Industries, Neuilly sur Seine, France

[22] Filed: Oct. 27, 1971

[21] Appl. No.: 193,026

[30] Foreign Application Priority Data
Oct. 29, 1070  France .............................. 7039041

[52] U.S. Cl. ................ 296/84 R, 52/208, 161/44, 161/45, 161/149, 296/84 K
[51] Int. Cl. ............................................. B60j 1/02
[58] Field of Search ..................... 296/84 R, 84 K; 52/203, 208, 400; 161/44, 45, 149; 156/101

[56]  References Cited
  UNITED STATES PATENTS
3,375,626  4/1968  Grotefeld et al. .................... 52/208
3,427,770  2/1969  Kunert et al. ........................ 52/203
3,009,845  11/1961  Wiser ..................................... 52/208
3,061,490  10/1962  Ryan ....................................... 161/44
3,081,205  3/1963  Shorr ..................................... 52/208
3,363,936  1/1968  Baker .................................. 296/84 R
3,630,812  12/1971  Bruckner et al. ................. 161/44 X Primary Examiner—Benjamin Hersh
Assistant Examiner—Leslie J. Paperner
Attorney—Dale A. Bauer et al.

[57]  ABSTRACT

A windshield having two layers of glass joined by a layer of thermoplastic adhesive remains intact in its central area and shatters at its periphery at selected energy levels which protect the human organism from destructive damage.

21 Claims, 6 Drawing Figures

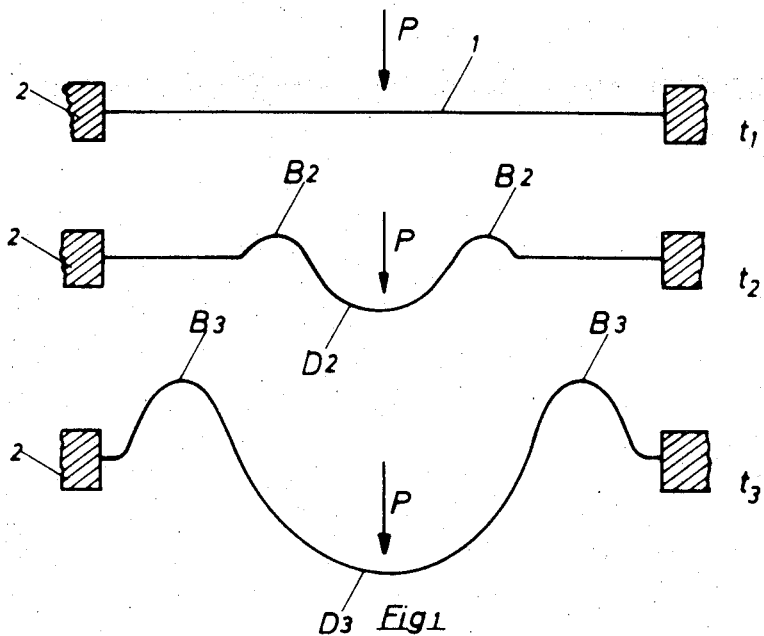
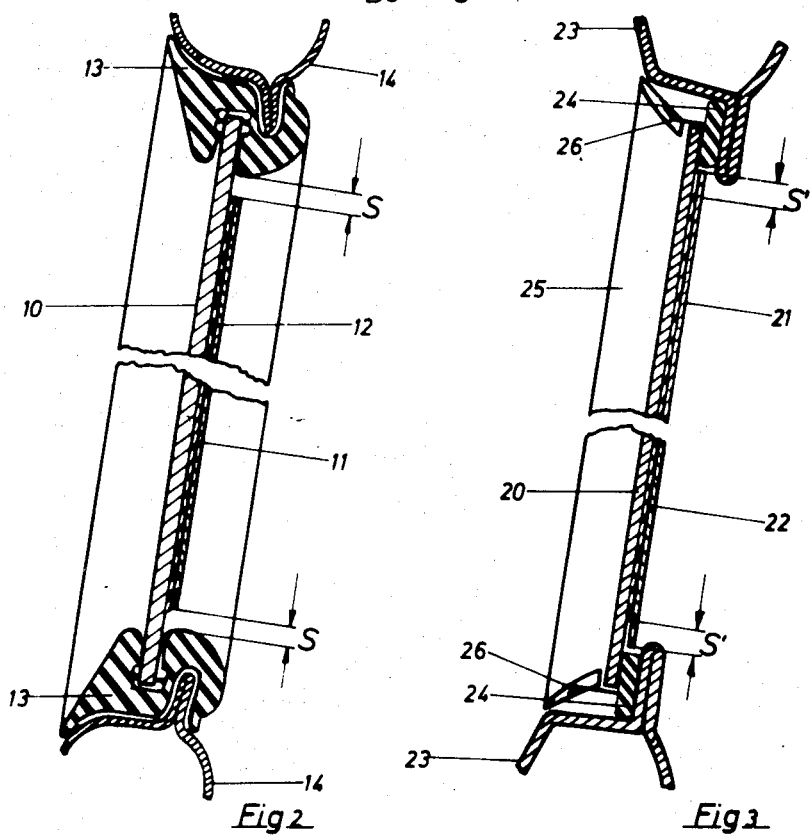

SAFETY WINDSHIELD

This invention relates to vehicle panes, such as windshields, which release quickly upon impact from within the vehicle, the object being to terminate their resistance to the shock of an object striking them, for instance the head of a passenger, before the buildup of destructive forces causes the passenger great injury. In a prior application assigned to the present assignee (Ser. No. 794,152, filed Jan. 27, 1969) now U.S. Pat. No. 3,630,812, dated Dec. 28, 1971, this problem was attacked in one way. The present invention attacks the problem in another way and constitutes an improvement.

This invention relates to laminated safety glass, the usual type of which in automobile practice consists of two thin layers of ordinary glass (silica-soda-lime glass, also called silicate glass) bonded together by an interlayer of polyvinyl butyral resin or some other transparent, rsinous, thermoplastic sheet. The present invention relates to such laminated products without regard to the number of layers or the resin pellicles used for adhesion. As the most important use is in automobiles, wherein the windshield has three layers of which at least one is of ordinary glass the invention will be described in that use without detracting from the generality of its application.

The objects of the invention are accomplished, generally speaking, by a safety windshield comprising a pane and a frame, the pane comprising an exterior lamina of silica-soda-lime glass, the circumference of which is gripped by the frame, supporting a lamina of adhesive and another lamina attached thereto, the circumference of the lamina of silica-soda-lime glass exceeding that of the other lamina by an amount which provides between the frame and such other lamina a gap, bridged only by a width of the lamina of silica-soda-lime glass, which is frangible by the curvature of the shock wave of small radius derived from an object striking the windshield. In these new windshields the central portion of the windshield is made strong enough not to shatter at the impact of a solid, rounded, e.g., spherical, object of 20 kg. moving at 50 km./hr.

These windshields offer great protection in case of accident especially in preventing great damage to the human head; the central area is not perforated and cutting, by shards of a shattered windshield, is eliminated or reduced to the infliction of minor wounds; the quick breaking of the lamina held by the frame, at its periphery, reduces or eliminates the flesh and bone damage that is characteristic of accidents involving ordinary laminated windshields. These windshields limit the forces of reaction acting on the human organism to a level that is below the point of grave danger.

The rupture of the exterior layer of glass, the circumference of which is fixed in the windshield frame, provides for an unlocking, or release, or ejection of the windshield at whatever level of energy or shock is selected. This occurs by a novel principle which is derived from the phenomenon that the impact of a body against the windshield generates a shock wave that travels rapidly outward toward the frame, actually bending the pane with a curvature which is insufficient to shatter the reinforced center but quite sufficient to shatter the unreinforced peripheral area adjacent the frame.

The energy level of release, that is to say the energy generated by shock which is sufficient to shatter the periphery of the windshield may be set at any chosen value, the magnitude of which will depend on the geometry and size of the windshield, and upon its angle of inclination, in the car body. The greater the inclination the smaller are those components of force, acting normal to it in case of accident, which determine the level of release. The invention provides the ability to vary that level. Thus the energy level of release can be lowered or raised, the latter being desirable when, in small windshields, the amplitude of the shock wave derived from impact suffers only a small reduction as it travels toward the frame.

In the patent referred to above methods of varying the breaking point of the windshield were proposed, for instance by using a thicker outer layer of glass fixed in the frame or by selecting a sheet of glass fixed in the frame of increased bending resistance at its periphery by thermal or chemical tempering. To lower the level of release it was also proposed that the exterior layer fixed in the frame should be thinner or should have low breaking point established by weakening it at spaced points or by a score line. All of those solutions had a common characteristic that the desired result was achieved by acting on the characteristics of mechanical resistance of the exterior layer of glass. In manufacturing windshields on a large scale in which very many types of windshields are made and in which very varied conditions exist related to the breaking point, those processes were not adapted to industrial use, in many circumstances requiring either individual treatment later on or the use of different types of raw materials producing glasses of different strengths.

The present invention proposes to supply a technique which is industrial and permits the variation of the level of release while always using one and the same base product for the exterior glass layer which is held by the frame. According to the invention this is achieved and the desired energy level of release is provided by alteration of the dimensions of the interior part of the windshield. Thus as more fully explained hereinafter the property of mechanical resistance of the outer layer of silicate glass can be altered within said limits with the energy level of release simply by changing the dimensions of the inner part of the windshield. The change in dimensions requires no additional operation because in every case the sheet and its reinforcement will be cut to a size and shape predetermined. It suffices, in consequence, to adapt the geometry to the exigencies of its use and the energy level at which release is to occur.

If the energy level of release is to be reduced it can be accomplished by establishing between the inner edge of the frame and the outer edge of the layers of reinforcement (plastic and glass) a space in regard to which the exterior sheet of glass supports only the bending resulting from the shock wave. To this extent it suffices in general to leave a space from about 1 to 8 mm. wide, and preferably from 1–5 mm. wide between the frame and the reinforcing layers. This space will normally and preferably extend throughout the periphery of the windshield.

The same result can be attained if the intermediate space is bounded only by the edge of the interlayer of plastic, whereas the reinforcing layer of glass, appearing on the inside of the car body may be prolonged without being connected to the plastic or to the outer sheet of glass. This prolongation can extend to the frame without being fixed in it.

If on the contrary it is desired to make more difficult the total release of a windshield having a stepped formation at its periphery it can be done easily by the present invention by prolonging at certain parts of its cirucmference portions of the inner, smaller sheet to the edge of the exterior sheet so that the interior sheet is connected to the exterior sheet throughout the totality of its surface, that is to say within the prolongation in question. To illustrate this the windshield has at its horizontal borders a stepped structure which extends into the frame while along the vertical edges which are shorter the interior sheet is prolonged to the edge of the outer sheet that is to say that along these borders the two sheets are superposed and that the inner sheet is equally fixed in the frame. Another way to express such a structure is to say that the outer sheet of glass is gripped in the frame throughout its periphery and the inner glass sheet has spaced projections or ears which extend beyond the plastic interlayer and are also gripped in the frame.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to likeparts throughout the several views, FIG. 1 is a diagrammatic representation of the shock wave which is generated in a windshield by the impact of a rounded body at its center;

FIGS. 2 and 3 are vertical sectional views illustrating two types of mounting windshields of the inventive type;

Figure 4:
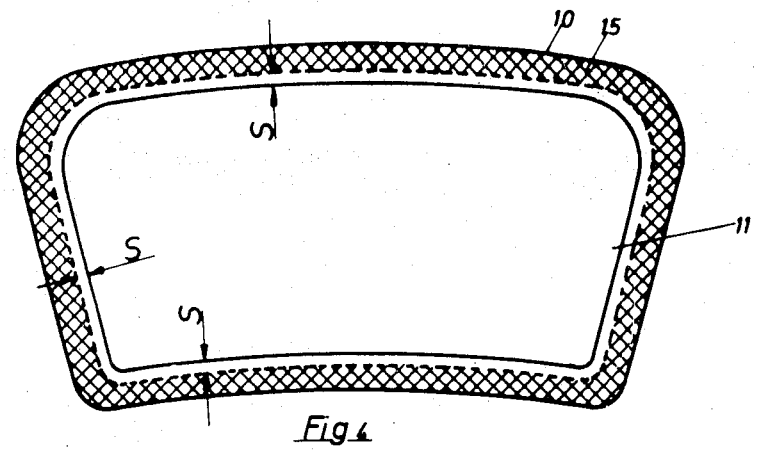
FIG. 4 is a plan view of the pane corresponding to FIG. 2.

In order to illustrate the reaction of a windshield of the invention, FIG. 1 schematically represents consecutively the process of deformation in response to a centrally applied shock P. In FIG. 1, top view, is shown the windshield just before the moment of impact $t_1$, in the middle diagram is shown the shock wave as it passes through the windshield toward the frame 2 at a succeeding moment $t_2$. In the lower of the three diagrams is shown the shock wave just before the moment of breakage at a moment $t_3$. At instant $t_1$ the body which produces the impact strikes the center of the windshield with a force P, the windshield being fixed in the frame 2 throughout its periphery. Around the point of impact the sheet is flexed in the direction of the shock to a curved shape D2 at the instant $t_2$. The magnitude of deformation D increases with time. At the same time there develops around the deformation D a circular wave or deformation B which travels outward toward the periphery. This bending wave B produces a bending of the sheet on the side which receives the shock, the amplitude of this bending wave increasing as it departs from the point of impact; that is to say that the amplitude of the bending wave B3 at instant $t_3$ is greater than the amplitude of wave B2 at instant $t_2$. The radius of curvature at the summit of this bending wave is substantially smaller than the radius of curvature in the central region D at the point of impact. As a consequence this wave of small radius puts great bending strains on the periphery of the windshield along the edge of the frame. Because the strains due to the bending wave at the periphery operate only in the glass of the outer layer which alone is mounted in the frame, the shock wave of short radius exceeds the elastic limit of the glass at the frame and shatters it, the central portion of the windshield remianing substantially intact.

According to the invention a basic principle used to alter the rigidity of the glass in its peripheral region, assuming a shock wave of a given value, is to change the amplitude of the shock wave by varying the rigidity, or resistance to bending, of the windshield, because such changes influence the radius of curvature assumed by the sheet and consequently alter the strains imposed upon the peripheral region of glass by the curvature of the wave. In this process a reduction of rigidity to bending corresponds to an increase in bending strains and produces a lowering of the level of release while an increase in rigidity to bending reduces the bending stresses and increases the energy level required for release.

FIG. 2 illustrates a windshield in which the bending rigidity has been reduced at the periphery. The light or pane is composed of an exterior sheet 10 of silicate glass and an interior glass sheet 11, the two sheets being bound together by means of an interlayer of thermoplastic polyvinyl butyral 12 having a thickness of at least 0.76 mm. The interior glass sheet 11 and the plastic interlayer 12 are of smaller dimensions than the exterior glass sheet 10, which is inserted in a peripheral frame 13 of grooved rubber which is itself mounted on the metal lip 14 of the body. The glass layer or sheet 11 and the plastic 12 have such dimensions that there is an intermediate space or gap S from 1 to 8 mm. wide between its edge and the edge of the frame. The larger that gap is the more easily the exterior sheet 10 may bend and the greater will be the amplitude of the flexing wave at the periphery of the glass sheet 10. That is to say that the level of energy required to dismount the windshield is lowered.

When the intermediate space S is considered unsightly it can be covered with an ornamental frame or by a supplemental rubber member.

FIG. 3 represents another structure producing a reduction in flexing rigidity in the peripheral region and consequently a lowering of the energy of release. The windshield is composed of an exterior sheet 20 of silicate glass and an interior sheet of silicate glass 21 which are joined adhesively together by the plastic layer 22, which is, in this example, a polyvinyl butyral sheet at least 0.76 mm. thick. The exterior sheet 20 is gripped around its periphery by the body member 23. Fixation is obtained in this example by means of a ring of butyl rubber 24 and outside by an ornamental element 25 which is held in place by clamps 26 which are operated from the back of the edge of glass 20. The interior sheet 21 extends to the immediate vicinity of the frame that is to say that it stops a little before the mounting layer 24 without actually touching that layer. The plastic layer 22 is smaller than interior sheet 21 so that there is a certain distance between their outer edges. Thus there is maintained throughout the whole circuit of the windshield a space S' in which the interior sheet 21 is not bonded to the outer sheet 20. From this it results that the flexing rigidity of sheet 20 is the sole determinant of the energy required for release, operating as in FIG. 2. It will be observed that the outer rim of S' of interior sheet 22 overlaps the metal frame so that in case the windshield is driven toward the interior of the car by some heavy blow the sheet 21 will take the residual shock should the sheet 20 break.

FIG. 4 represents a plan view of a windshield in which the rigidity of flection is reduced in a structure corresponding to that of FIG. 2. The interior sheet of glass 11 has smaller dimensions than exterior sheet 10 and is adhesively connected to the latter, forming a structure stepped at the periphery. The exterior sheet 10 is gripped by the frame over the peripheral band 15 (crosshatched) while that band and the interior sheet 11 are spaced apart by a distance S which is determined according to the result desired.

Figure 5:
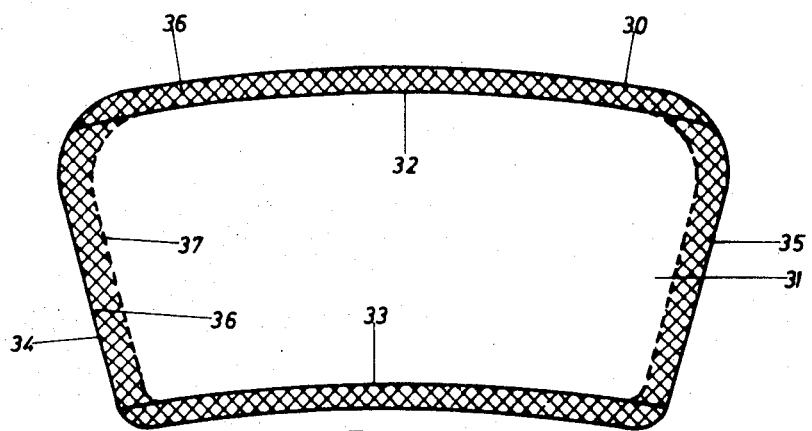
FIGS. 5 and 6 are plan views of windshield panes in which the construction causes an increase in the amount of energy necessary for release.

In FIG. 5 there is represented in plan view a realization of a windshield according to the invention in which the rigidity to flection has been increased so as to retard complete release. The structure is similar to that previously described. The interior sheet 31 has dimensions such that its side or vertical edges 34 and 35 overlap that is, are in registration or coincidence with, the vertical edges of the exterior sheet 30, while the upper and lower or horizontal edges 32 and 33 have edges which are spaced inward from the edges of the outer sheet 30. The mounting of this windshield in the frame includes the peripheral region 36 which is crosshatched and which extends up to the dotted line 37. Thus, while the horizontal edges of the interior glass 31 are outside of the frame of the windshield, the vertical edges of the interior sheet 31 are fixed in the frame of the windshield with the exterior sheet 30. In case of a shock on the windshield the shattering of the glass will occur first along the horizontal borders where only one layer of glass is engaged.

Figure 6:
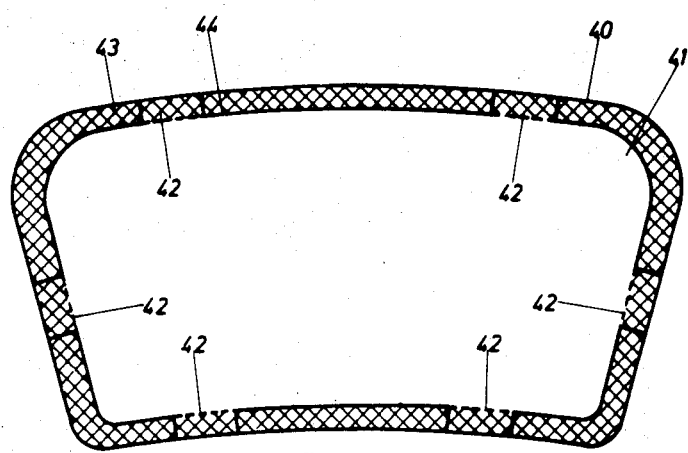

Similarly the total release of the windshield can be retarded by the features of novelty in FIG. 6. The interior sheet 41, of glass, has dimensions smaller than the outer sheet 40 and is connected to it with a sheet of polyvinyl butyral at least 0.76 mm. thick. Nevertheless along its periphery the interior sheet 41 is provided with projections or ears 42 which extend out to the periphery of sheet 40. These projections 42 are equally joined by the polyvinyl butyral sheet to the outer layer 40 and are gripped in the frame while, between these projections, the edge of the interior sheet 41 matches that of the bonding layer. The peripheral area which is fixed in the frame is represented in crosshatch and extends up to the dotted line 44. By varying the position, the number, and the size of these projections one can vary the level of release at will within large limits.

The effect of these characteristics of the invention may be appreciated by reference to the following tests. In making these tests the index of severity related to the risk of wounds in the head by contact with the windshield has been adopted and has been defined as the integral of $$\int_{t_0}^{t_1} b^{2.5} dt$$

In this formula $b$ is the established deceleration expressed in $g$'s (acceleration of gravity), $t_0$ is the instant of shock and $t_1$ is the time at the terminus of the shock period. This index of severity should be considered as the criterion for the measurement of the risk of cerebral lesions. The smaller the index of severity the smaller is the primary risk of injury when the head strikes the windshield.

As a second basis for evaluation we considered the maximum deceleration attained during the plastic deformation of the windshield, that is to say for a laminated windshield during the plastic deformation of the polyvinyl butyral interlayer. This value may be considered as a basis for evaluating the risk of cranial fracture.

The results of the first comparative tests show in what measure these evaluations are reduced by changing the dimensions of space S. The tests were made with an ordinary DAIMLER-BENZ W 114/115. The windshields were made of an exterior sheet of silicate glass 3 mm. thick, untempered. The adhesive interlayer of polyvinyl butyral was 1.14 mm. thick, the interior sheet of silicate glass was 2 mm. thick and untempered. The windshield was mounted in the body at an angle of 55° to the vertical. The panes were mounted in the body in a butyl rubber ring. The shock tests were carried out with an artificial head weighing 10 kg. which struck the 55° windshield horizontally with an impact of 45 km/hr. The deceleration record is the resultant of all the components. The first test was carried out with a windshield in which the interior sheet of glass extended to the frame without touching it. This test produced an index of severity of 725 and a maximum deceleration of 63 g. The windshield did not separate at its periphery.

In the second test a space or gap about 2 mm. was established between the interior sheet and the plastic interlayer and the near edge of the frame. The index of severity was 393, there was a maximum deceleration of 55.5 g. and the window was shattered along a total length of 110 cm.

In a second series of tests the effect of progressive intrusion of the interior sheet of glass into the frame was studied. This case was interesting when, because of the size of the sheets and the mounting of the windshield, the windshield was totally shattered along the circumferential edge by impact energies which were relatively small, the artificial head being projected outward through the opening made by the separation of the windshield with a residual energy larger or smaller but apparently sufficient to risk secondary injuries. It is to avoid this risk that the overlapping structure is interrupted from place to place. The importance of the space of the projections is chosen so as not to exceed values admissible under the index of severity. In comparison with the first series of tests the conditions were more severe because the shocks were made with two artificial heads each weighing 10 kg. which move parallel 50 cm. apart, striking the windshield at intervals of 15 milliseconds. This simulated an accident in which not only the driver but the passenger struck the windshield. Even in this case the kinetic energy of the two bodies was absorbed by the windshield. The windshield was composed of two glass sheets 500 × 1,100 mm. They were constituted of two sheets of silicate glass 2.7 mm. thick bonded together with polyvinyl butyral 1.14 mm. thick, The windshield was mounted at an angle of 35° to the vertical. The artificial heads struck with an impact of 42 km./hr.

In the first test, a windshield was used which had a stepped rim throughout its stepped rim throughout its periphery of which the interior sheet of glass approached but did not touch the frame. At the shock the windshield was completely freed throughout its circumference so that there remained important residual energies. In the second test a windshield was used which had a stepped structure at the edge but in which there were projections of the interior glass sheet which reached the edge of the outer sheet and were gripped in the frame. The windshield was retained long enough in its mounting to totally absorb the energy of the shock of the two articifial heads. The windshield was shattered along its upper border. For the head which struck first the index of severity was 158 with a maximum deceleration of 34 g. The corresponding values for the second head were less than that.

For comparative purposes a similar windshield having no stepped structure was tested, but did not break in any region. For the first striking head the index of severity was 505 and with the maximum deceleration of 57 g. Further tests using a single artificial head produced values yet higher and more dangerous.

Among the advantages of this invention are these:

The outer sheet of the windshield, the periphery of which is held in the frame, is not weakened whereas in some prior practice it was scored to produce a frangible line. The secondary or interior sheet is also not weakened because the projections which extend into the frame are of one piece and are not scored. The windshield can be made to break under whatever conditions its service requires, for instance by selecting cooperative thicknesses for the outer sheet which is held in the frame, and the plastic layer and inner layer. Furthermore modification can be brought about by adjusting the space between the near edge of the frame and the outer edge of the inner supporting layers. This windshield breaks upon impact, utilizing the phenomenon of shock wave transmission which leaves the windshield area intact but shatters the glass in the peripheral gaps. The structure of the windshield is such that it can be made to yield at any selected level of impact energy. For breakage at the higher levels of impact energy the inner glass sheet can be extended outward beyond the plastic interlayer and gripped wholly or in part in the frame with the outer or main layer. The windshield can be constructed to yield at a rate which will protect the structure of the human organism from serious damage.

To express the modifications in other words, certain parts of the periphery of the interior glass sheet and of the plastic interliner can be projected and mounted in the frame to strengthen the windshield and increase the energy required for release. In FIG. 5 for example the interior glass sheet 31 is prolonged at its vertical edges only to match the periphery of exterior sheet 30, both sheets being gripped in the frame, while along the horizontal edges 32 and 33 only the edges of the outer glass sheet are gripped. It is to be understood that the plastic sheet can be extended horizontally to match the greatest extent of the two glass sheets if desired.

FIG. 6 illustrates another example in which it is not the small sides of the interior glass sheet which are held in the frame but only projections 42 on its edges, it being understood that the plastic sheet may also have projections to match those of the glass. In general it is inadvisable to project portions of the adhesive interliner unless they are covered by glass.

As many apparently widely different embodiments of the present invention may be made without departing from the spirit and scope thereof, it is to be understood that the invention is not limied to the specific embodiments.

What is claimed is:

1. In a safety windshield, a pane comprising superposed outer and inner sheets of silicate glass, at least said outer sheet being untempered, said sheets being unitized by an interlayer of adhesive plastic, and a mounting frame gripping the periphery of said outer sheet, said inner sheet having dimensions such that at least its top and bottom border edges stop short of and are free and clear of said mounting frame by a preselected distance.

2. The windshield of claim 1, said interlayer and inner sheet being essentially conterminous to thereby afford a narrow free peripheral area of said first sheet of rigidity materially less than that of the area defined by the boundary of said inner sheet and said interlayer.

3. The windshield of claim 1, said inner sheet having its peripheral edge contiguous to but out of contact with the inner edge of the frame, the peripheral edge of the plastic interlayer being radially inset from the peripheral edge of said inner sheet.

4. The windshield of claim 1, the peripheral edge of said outer sheet being fixed in the frame substantially throughout its periphery, said inner sheet having peripherally-spaced discrete radial extensions each extending into and held by said frame, the interlayer being conterminious with said inner sheet and its extensions.

5. The windshield of claim 1, said inner sheet also being untempered.

6. The windshield of claim 1, the border edges of said inner sheet stopping short of and being free and clear of said mounting frame, throughout the peripheral extent thereof.

7. The windshield of claim 6, the spacing of the border edge of said inner sheet from said frame being a preselected essentially uniform distance of between about 1 and 8 mm., and preferably between about 1 and 5 mm.

8. A windshield comprising a pane of untempered silica glass and a mounting frame therefor, said pane comprising a first exterior sheet, the peripheral border of which is gripped in and by the frame, and a second interior sheet of glass adhesively secured to said first sheet in superposed relation therewith, said second sheet being supported essentially solely by said first sheet and having its boundary edge spaced from said frame by an essentially uniform pre-selected distance of from about 1 to 8 mm.

9. The windshield of claim 8 the spacing between the frame and the boundary edge of said sheet being between about 1 and 5 mm.

10. The windshield of claim 8, said second sheet including integral relatively narrow projections spaced about its periphery, each said projection extending into and being gripped by said frame.

11. A windshield for vehicle comprising an exterior sheet of untempered silicate glass having a peripheral marginal portion thereof gripped by a supporting frame, an interior sheet of glass, and an interlayer of plastic material interposed between the interior sheet and the interior surface of the exterior sheet to thereby support the interior sheet, the major portion of the peripheral edge of the interior sheet being within the inner periphery of said gripped marginal portion of the exterior sheet and the major portion of the peripheral edge of said interlayer being spaced inwardly from said gripped marginal portion of the exterior sheet a uniform distance of between 1 mm. and 8 mm., said distance being inversely related to the level of impact energy required to be applied to the inner surface of the windshield to cause fracture of the exterior sheet along the space between the gripped marginal portion thereof and said interlayer.

12. A windshield as defined in claim 11 wherein the interlayer and the interior sheet are coextensive.

13. A windshield as defined in claim 11 wherein the entire periphery of said interlayer is spaced from said gripped marginal portion of the exterior sheet.

14. A windshield as defined in claim 11 wherein the entire periphery of said interior sheet is within said mraginal portion of the exterior sheet.

15. A windshield as defined in claim 11 wherein a portion of the frame freely overlaps a small marginal portion of the inner surface of the interior sheet.

16. A windshield as defined in claim 11 wherein circumferentially spaced portions of said interior sheet extend into and are gripped by said frame.

17. A windshield as defined in claim 16 wherein said interlayer is coextensive with said interior sheet.

18. The method of controlling the force of impact required to shatter a windshield of safety glass along its periphery only, and comprising a mounting frame, a first exterior sheet of untempered silica glass having its peripheral edge secured in and gripped by the frame, and a second interior sheet of glass adhesively secured by an interlayer of plastic to the first sheet, in superposed relation therewith, and having its peripheral edge conforming to the shape of the first sheet but stopping short of the frame by an essentially uniform radial distance, said method comprising, preselecting said radial distance in accordance with the desired minimum shattering force of impact.

19. The method of claim 18, the radial distance being selected inversely with increase in the desired minimum shattering force of impact.

20. The method of claim 19, the selected radial distance being essentially the same for windshields having the same thickness of sheets, interlayer, and emplaced angle of inclination of windshield mounting the vertical, over a range of sizes and shapes of the glass sheets.

21. The method of claim 20, the second sheet also being of untempered silica glass.

* * * * *

PO-1050
(5/69)

UNITED STATES PATENT OFFICE
CERTIFICATE OF CORRECTION

Patent No. 3,764,178        Dated October 9, 1973

Inventor(s) Hans Krings et al.

It is certified that error appears in the above-identified patent and that said Letters Patent are hereby corrected as shown below:

Column 6, line 64, cancel "stepped rim throughout its" (second occurrence).
Column 8, line 49, insert --second-- after "said".
Column 10, line 19, insert --to-- after "mounting".

Signed and sealed this 1st day of October 1974.

(SEAL)
Attest:

McCOY M. GIBSON JR.        C. MARSHALL DANN
Attesting Officer           Commissioner of Patents